US012795382B2

(12) United States Patent
Smith et al.

(10) Patent No.: US 12,795,382 B2
(45) Date of Patent: Nov. 10, 2026

(54) EFFICIENT COORDINATED REAL-TIME SPATIAL REUSE TOPOLOGY DISCOVERY

(71) Applicant: Cisco Technology, Inc., San Jose, CA (US)

(72) Inventors: Malcolm M. Smith, Richardson, TX (US); Brian Hart, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 322 days.

(21) Appl. No.: 18/585,361

(22) Filed: Feb. 23, 2024

(65) Prior Publication Data

US 2025/0274771 A1 Aug. 28, 2025

(51) Int. Cl.

| | |
|---|---|
| ***H04W 16/14*** | (2009.01) |
| ***G06N 20/00*** | (2019.01) |
| ***H04W 48/10*** | (2009.01) |
| ***H04W 48/20*** | (2009.01) |

(52) U.S. Cl.

CPC ............ *H04W 16/14* (2013.01); *G06N 20/00* (2019.01); *H04W 48/10* (2013.01); *H04W 48/20* (2013.01)

(58) Field of Classification Search

CPC ..... H04W 16/14; H04W 48/10; H04W 48/20; G06N 20/00

See application file for complete search history.

(56) References Cited

U.S. PATENT DOCUMENTS

| | | | | |
|---|---|---|---|---|
| 8,861,383 | B2 * | 10/2014 | Pandey | H04W 48/16 370/252 |
| 2018/0206184 | A1 * | 7/2018 | Bahr | H04W 24/02 |
| 2018/0302930 | A1 * | 10/2018 | Wang | H04W 48/18 |
| 2019/0075469 | A1 * | 3/2019 | Mahoney | H04B 17/318 |

(Continued)

FOREIGN PATENT DOCUMENTS

| | | | | |
|---|---|---|---|---|
| CN | 106165495 A | * | 11/2016 | H04W 48/08 |
| CN | 112804074 A | * | 5/2021 | H04W 24/02 |
| WO | 2022051408 A1 | | 3/2022 | |
| WO | 2022232578 A1 | | 11/2022 | |
| WO | 2023108426 A1 | | 6/2023 | |

OTHER PUBLICATIONS

International Search Report and Written Opinion for International Application No. PCT/US2025/016194, mailed May 12, 2025, 13 pages.

(Continued)

*Primary Examiner* — Erika A Washington

(74) *Attorney, Agent, or Firm* — Edell, Shapiro & Finnan, LLC

(57) ABSTRACT

A method is provided that is performed in a wireless network that includes a plurality of wireless access points configured to operate in a multi-access point coordination arrangement. The method comprising selecting, among the plurality of wireless access points, one or more candidate co-channel wireless access points for future transmit opportunity time intervals; identifying candidate wireless client devices communicatively connected to the one or more candidate co-channel wireless access points; selecting, among the candidate wireless client devices, one or more cell edge wireless (Continued)

client devices to be used for wireless entity measurement requests; and causing each of the one or more candidate co-channel wireless access points to send directed wireless entity measurement requests to the one or more cell edge wireless client devices.

20 Claims, 7 Drawing Sheets

(56) References Cited

U.S. PATENT DOCUMENTS

| | | | | |
|---|---|---|---|---|
| 2021/0120427 | A1 | 4/2021 | Wang et al. | |
| 2022/0095235 | A1* | 3/2022 | Zhang | H04W 72/20 |
| 2022/0210861 | A1 | 6/2022 | Monajemi et al. | |
| 2022/0408355 | A1 | 12/2022 | Shafin et al. | |
| 2023/0164700 | A1 | 5/2023 | Park et al. | |
| 2023/0318763 | A1 | 10/2023 | Cherian et al. | |
| 2023/0319886 | A1 | 10/2023 | Wang et al. | |

OTHER PUBLICATIONS

Szott S., et al., "Proposed IEEE 802.11 AIML TIG Technical Report Text for the Multi-AP Coordination Use Case", 11-23-0227-05-AIML-Proposed-IEEE-802-11-AIML-TIG-Technical-Report-Text-For-The-Multi-AP-Coordination-Use-Case, IEEE-SA, Mentor, Piscataway, NJ USA, vol. 802.11 AIML, No. 5, XP068203785, https://mentor.ieee.org/802.11/dcn/23/11-23-0227-05-aiml-proposed-ieee-802-11-aiml-tig-technical-report-text-for-the-multi-ap-coordination-use-case.docx, Mar. 2023, pp. 1-6.

Ahn, W., "Novel Multi-AP Coordinated Transmission Scheme for 7th Generation WLAN 802.11be," Entropy, MDPI, https://www.mdpi.com/1099-4300/22/12/1426, Dec. 17, 2020, 19 pages.

Imputato, P., et al., "Beyond Wi-Fi 7: Spatial Reuse Through Multi-AP Coordination," Computer Networks, vol. 239, https://www.sciencedirect.com/science/article/pii/S1389128623006059, Feb. 2024, 15 pages.

Nunez, D., et al., "TXOP Sharing with Coordinated Spatial Reuse in Multi-AP Cooperative IEEE 802.11 be WLANs," https://arxiv.org/abs/2112.00515, Dec. 2021, 7 pages.

* cited by examiner

EFFICIENT COORDINATED REAL-TIME SPATIAL REUSE TOPOLOGY DISCOVERY

TECHNICAL FIELD

The present disclosure relates to wireless networking.

BACKGROUND

As currently proposed by 802.11UHR ("WiFi8"), spatial reuse (SR) groups for the purpose of exploiting concurrent transmit opportunities (TXOPs) under Multi-Access Point Coordination (MAPC) are reliant upon periodic and uncoordinated IEEE 802.11k Beacon-Reporting to assess inter-cell co-channel interference. In an enterprise venue with tens or hundreds of users per access point, this "blind polling" approach is expensive in terms of over-the-air (OTA) bandwidth consumption in order to keep up stability or coherence time (Tc) of the channel (e.g., hundreds of clients per access point approximately every 100 milliseconds).

DESCRIPTION OF EXAMPLE EMBODIMENTS

Overview

Presented herein are techniques to minimize the amount of beacon reporting exchanges in a wireless network that involves a plurality of wireless access points configured to operate in one or more coordination groups.

In one form, a method is provided that is performed in a wireless network that includes a plurality of wireless access points configured to operate in a multi-access point coordination arrangement. The method comprises selecting, among the plurality of wireless access points, one or more candidate co-channel wireless access points for future transmit opportunity time intervals; identifying candidate wireless client devices communicatively connected to the one or more candidate co-channel wireless access points; selecting, among the candidate wireless client devices, one or more cell edge wireless client devices to be used for wireless entity measurement requests; and causing each of the one or more candidate co-channel wireless access points to send directed wireless entity measurement requests to the one or more cell edge wireless client devices.

Example Embodiments

Figure 1:
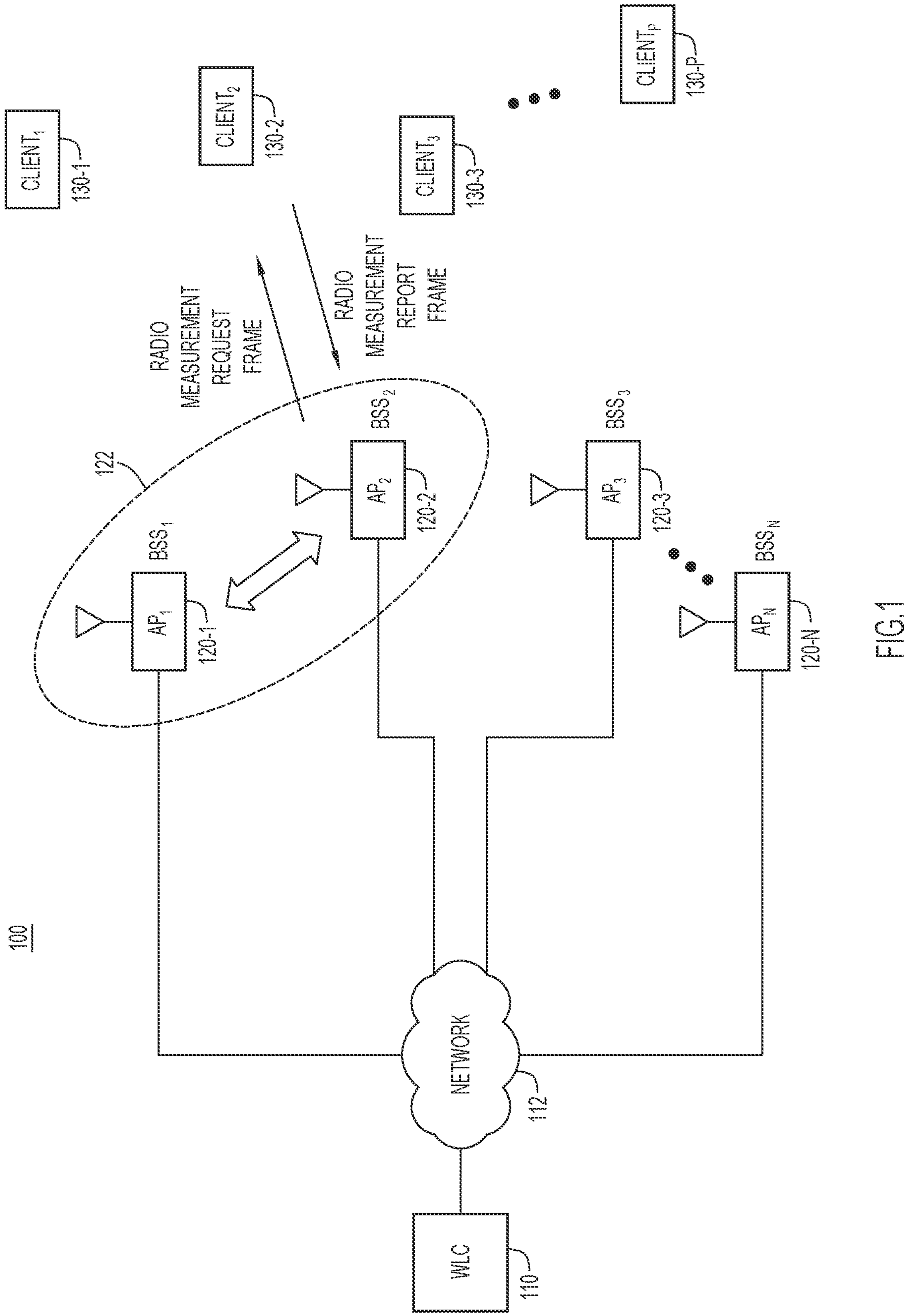
FIG. 1 is a diagram of a system including a plurality of wireless access points and a wireless network controller configured to perform topology discovery operations, in accordance with an example embodiment.

Referring first to FIG. 1, a block diagram is shown of a system 100 that includes a wireless local area network controller (WLC) 110 that is in communication, via a local area or wide area network (network) 112, with a plurality of access points that serve wireless clients in a wireless local area network. More specifically, there are a plurality of wireless access points (APs) 120-1 to 120-N and a plurality of wireless clients 130-1, 130-2, 130-3, . . . , 130-P. At any given time, any of the APs 120-1 to 120-N may be configured as a leader AP of a coordination group of APs for multi-AP coordination (MAPC). For example, FIG. 1 shows that AP 120-1 is a leader AP for a coordination group (CG) 122 that includes AP 120-1 and AP 120-2.

A leader AP, such as AP 120-1, has knowledge of all the stations served by APs in the CG 122 and can determine whether concurrent transmit opportunities (TXOPs) between two APs can occur. It is desirable that a transmission from AP 120-1 during one of those concurrent TXOPs does not cause too much interference with a client that AP 120-2 is communicating with, so-called inter-Basic Service Set (BSS) interference.

The IEEE 802.11k protocol uses the following terms: Radio Measurement Request frame that includes a Measurement Request element, referred to as a Beacon Request and a Radio Measurement Report frame that can include N Measurement Report elements, referred to as Beacon Reports. The terms "Beacon Request" and "Beacon Report" are thus often used as a shorthand. The IEEE **802.11*k*** specification provides further detail on these aspects, and also provides for compact or lightweight versions of the Beacon Request and Beacon Report, all of which are envisioned in the techniques presented herein.

Inter-BSS interference issues can be learned by a beacon report mechanism. Through the beacon report mechanism defined in IEEE 802.11k or some variation or lightweight version of it, a given AP can ask a client how it hears other BSS's (other APs and other clients in other BSS's). Furthermore, in one embodiment, through the frame report mechanism defined in IEEE 802.11k (or some variation or lightweight version of it), a given AP can ask a client how strongly it hears other clients, such as clients of other BSS's. For example, AP 120-1 may use the beacon report mechanism to learn how a client detects signals from AP 120-2 or AP 120-3 and to respond with a beacon report that provides Receive Signal Strength Indication (RSSI) information or calibrated RSSI of how that client hears the other APs and (optionally) other clients, such as all clients in a BSS identified by a BSSID and all clients in an inter BSS (i.e., any BSS but the client's own BSS or multi-BSS). Statistics may be reported per inter-BSS (for greater compression). The WLC 110 can process these beacon reports and determine whether a transmission of two or more APs (e.g., of AP 120-1 and AP 120-2) will cause interference degradation at one or more clients. FIG. 1 shows AP 120-2 sending a Radio Measurement Request Frame (e.g., Beacon Request) to client 130-2 and receiving a Radio Measurement Report Frame (e.g., Beacon Response) from client 130-2.

In an enterprise, there could be tens of APs that could take transmit opportunities on the same channel. Each AP could have hundreds of clients/stations. Thus, there could be thousands of clients in an enterprise network environment. If the beacon report process is invoked before taking a TXOP, the APs could spend all the airtime just asking clients for beacon reports. This does not scale for large wireless network deployments.

As explained above, APs 120-1 to 120-N may belong to one or more CGs. The WLC 110 may store the data from those multiple groups. The computing resources of the WLC 110 may be leveraged to do various modeling operations as described, as well as to process data obtained from beacon reports for the purpose of topology discovery. The WLC 110 ultimately generates a list of clients to poll with directed beacon requests for purposes of assessing co-channel interference at a scheduled TXOP.

Figure 2:
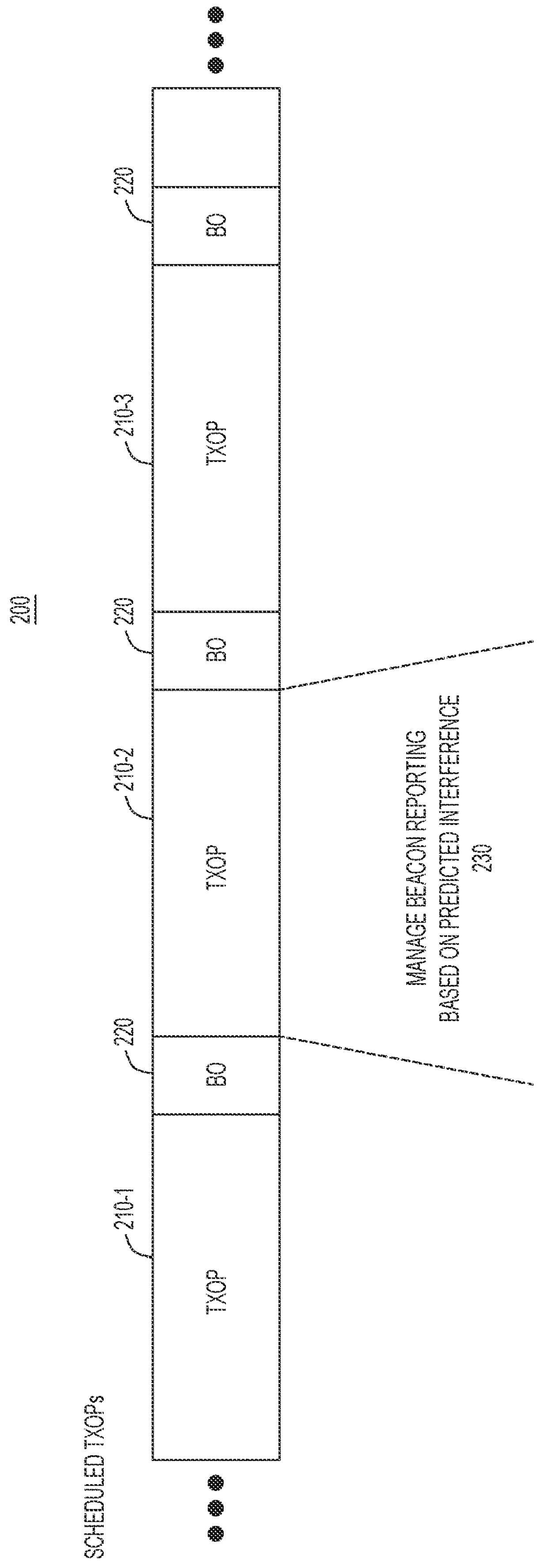
FIG. 2 shows a sequence of scheduled transmit opportunity time intervals for which interference prediction is performed in order to assign wireless access points to coordination groups to minimize interference at scheduled transmit opportunity time intervals, according to an example embodiment.

Techniques are presented herein to provide limited and coordinated sounding/beacon-reporting based on MAPC scheduled TXOPs. Reference is now made to FIG. 2, which shows a sequence 200 of scheduled TXOPs 210-1, 210-2, 210-3, etc., separated by back-off (BO) intervals 220. As will become apparent from the following description, and shown at 230, techniques are presented to manage beacon reporting around scheduled TXOPs based on predicted interference so as to minimize interference during a given TXOP and also to limit beacon reporting so as to minimize occupying the wireless channel with the radio measurement related exchanges.

Figure 3:
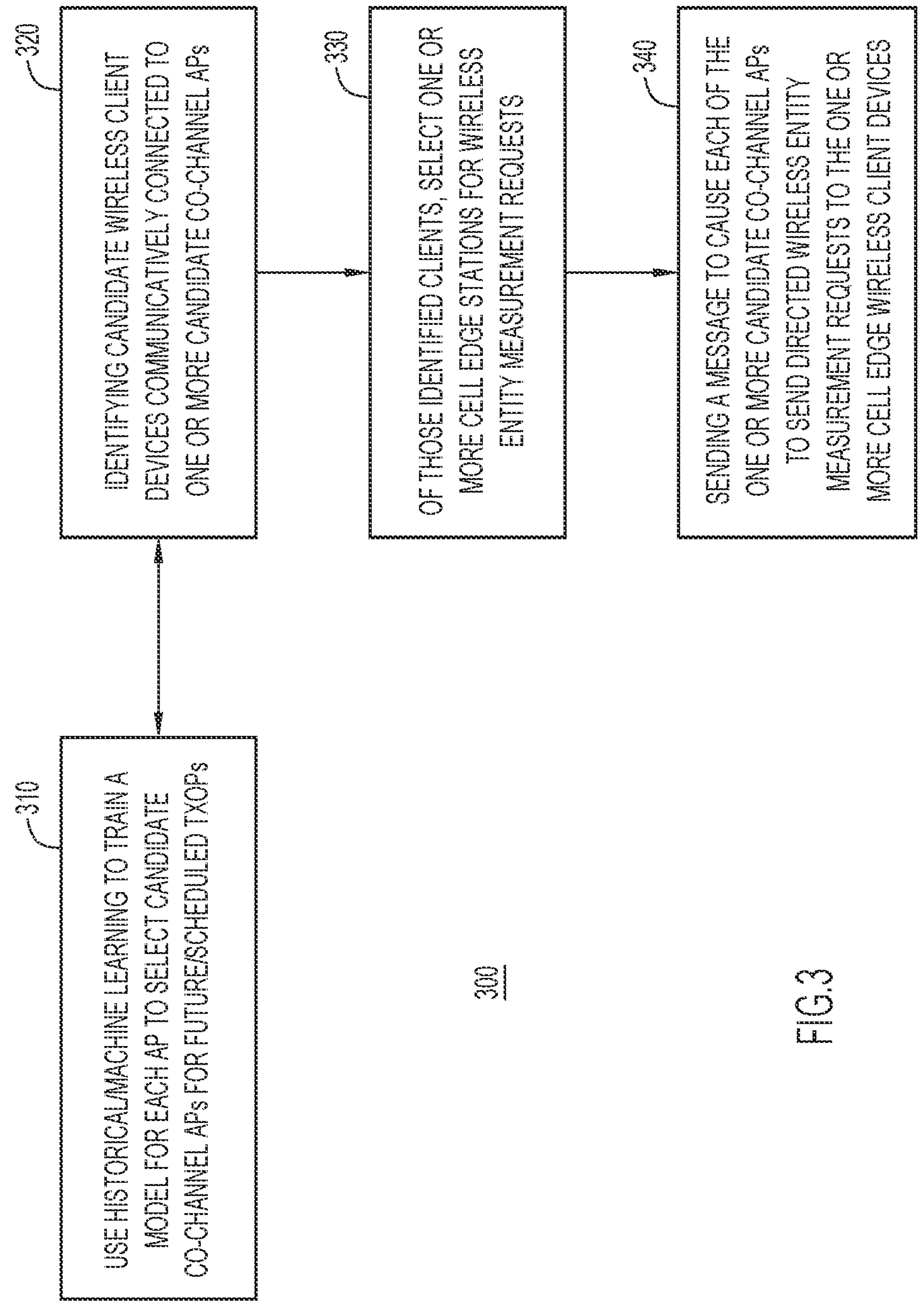
FIG. 3 illustrates a high-level flow chart of a process for predicting interference in order to assign wireless access points to coordination groups to minimize interference at scheduled transmit opportunity time intervals, according to an example embodiment.

Turning now to FIG. 3, a high-level flow chart of a process 300 is now described. The process 300 may be performed by the WLC 110. The process 300 involves, at 310, using historical data and/or machine learning techniques to train a model, in order to select, for each AP in a coordination group, candidate co-channel APs for future/scheduled TXOPs. At 320, the process 300 involves identifying candidate wireless client devices communicatively connected to the one or more candidate co-channel APs. At 330, the process 300 involves selecting, among the candidate wireless client devices, one or more cell edge clients to be used for wireless entity measurement requests. At 340, the process 300 involves causing each of the one or more candidate co-channel APs to send directed wireless entity measurement requests to the one or more cell edge clients. The wireless entity measurement request could be any of the aforementioned IEEE 802.11k radio measurement frames and their lightweight versions.

Operations 310, 320 and 330 can be used at a relatively fast rate (e.g., every 100 transmit units (approximately 100 milliseconds (ms)), that is, every beacon period/beacon interval, with continual (localized) refinement of the representative cell-edge client until it can be concluded that APs are no longer co-channel (no longer in discovery frames and radio measurement reports).

Operations 310 and 320 may be executing in parallel. The model training process of operation 310 may run continuously to trial AP candidates based on the training criteria established (circle neighborhoods and historical CG members) and to limit AP-to-AP (and ideally client-to-AP, AP-to-client and client-to-client) interference such that signal-to-interference-plus-noise (SINR) (or signal-to-interference (SIR) or absolute interference level) between BSSs is bounded, accounting for traffic patterns. Operation 310 may be constantly running in the background to produce the most promising CGs (i.e., with limited inter-BSS interference, accounting for traffic patterns). Operation 320 is constantly running in the background to discover quality changes, but it may be timed to be just before the beacon scanning to maximize the performance (and maximizes the relevant knowledge) in beacon reports, as described below in connection with FIG. 4.

Operation 330 relies on operations 310 and 320. The output of operation 330 is a list of clients/stations per AP to instruct to go scan by invoking the directed wireless entity measurement requests (e.g., directed beacon request/report process), as described below in connection with FIGS. 4 and 5.

As explained above in connection with FIG. 3, one aspect of limiting wireless entity measurement requesting/reporting is determining the most likely co-channel APs (and/or their BSS's) that are most likely to produce interference. In MAPC, client-based scheduling for traffic is used that has a well-known period or well-known delivery characteristics, such as is the case with video and voice. It is possible, therefore, to know there will be upcoming TXOPs for particular flows/clients and there is no concern with interference with other clients in the network.

Operation 310 in the process 300 may involve using historical techniques to determine candidate co-channel APs. In one form, such historical techniques may involve ML techniques to train a model for each of the APs and use the model to select co-channel candidates. For example, a supervised artificial neural network (ANN), decision tree, logistic regression, or other ML techniques may be employed. The training may involve classifying APs that were, and were not, actual co-channel interface (CCI) neighbors/blockers at previous scheduled TXOPs using features like AP-to-AP RSSI, and which APs had clients/stations that had conflicts with neighboring APs from previous radio measurement reports, to thereby predict which TXOP number in a MAPC time-slot sequence will be subject to interference based on some periodic nature that has been observed. A fairly shallow ML model (a model with few hidden layers) may be used to predict the future interference between APs.

The ability to predict future interference on a certain time-slot can be used to configure (e.g., optimize) the size of coordination groups that are formed while still avoiding forming coordination groups with sets of APs that historically cause interference on certain time slot(s), especially if they are time sensitive time slots. The results in more useful TXOPs because there is reduced concern/focus on the APs that have a history of not causing much interference. Thus, by using prior observances of co-channel interface and prior AP/client radio measurement reports, prediction of interference can be made, particularly around the slot sequence or periodic traffic. Again, this can increase the AP/BSS density of coordination groups and increase the number of concurrent TXOPs as focus can be made on the co-channel interference prediction at the scheduled TXOP and not co-channel interference in general. The output of operation 310 is a list of candidate co-channel APs for future/selected TXOPs.

Operation 320 involves identifying clients of those candidate co-channel APs (in operation 320) that are most likely to represent the BSS's of those candidate co-channel APs (that those APs should direct a wireless entity measurement request to for co-channel interference determination). To this end, and with reference to FIG. 4 and continued reference to FIG. 1, operation 320 may involve a coordinated mutual radio resource management process 400 between APs just before beacon requests are sent to maximize correlation with downlink beacon transmission from AP to client. Each AP in the network periodically sends a Neighbor Discovery Protocol (NDP) frame (or Beacon frames) on every channel and band possible to discover other APs. The NDP frames may be broadcast messages transmitted at the maximum allowed power for the channel/band, at the lowest supported data rate and without beamforming to provide information about a neighboring AP's radio information. By default, a NDP frame may be transmitted over all channels every 180 seconds. The AP goes off-channel roughly every 16 seconds to send an NDP frame over the 11 channels in the 2.4 GHz band, and every 8 seconds for the 22 channels in the 5 GHz band. Received NDP frames, and the corresponding RSSI (expressed in dBm and with a resolution of 1 dBm) and channel may be forwarded to the WLC 110 (FIG. 1). The WLC 110 may average these values over a period of time (e.g., 15 minutes, the so-called pruning interval), corresponding to five measurements per neighbor.

Figure 4:
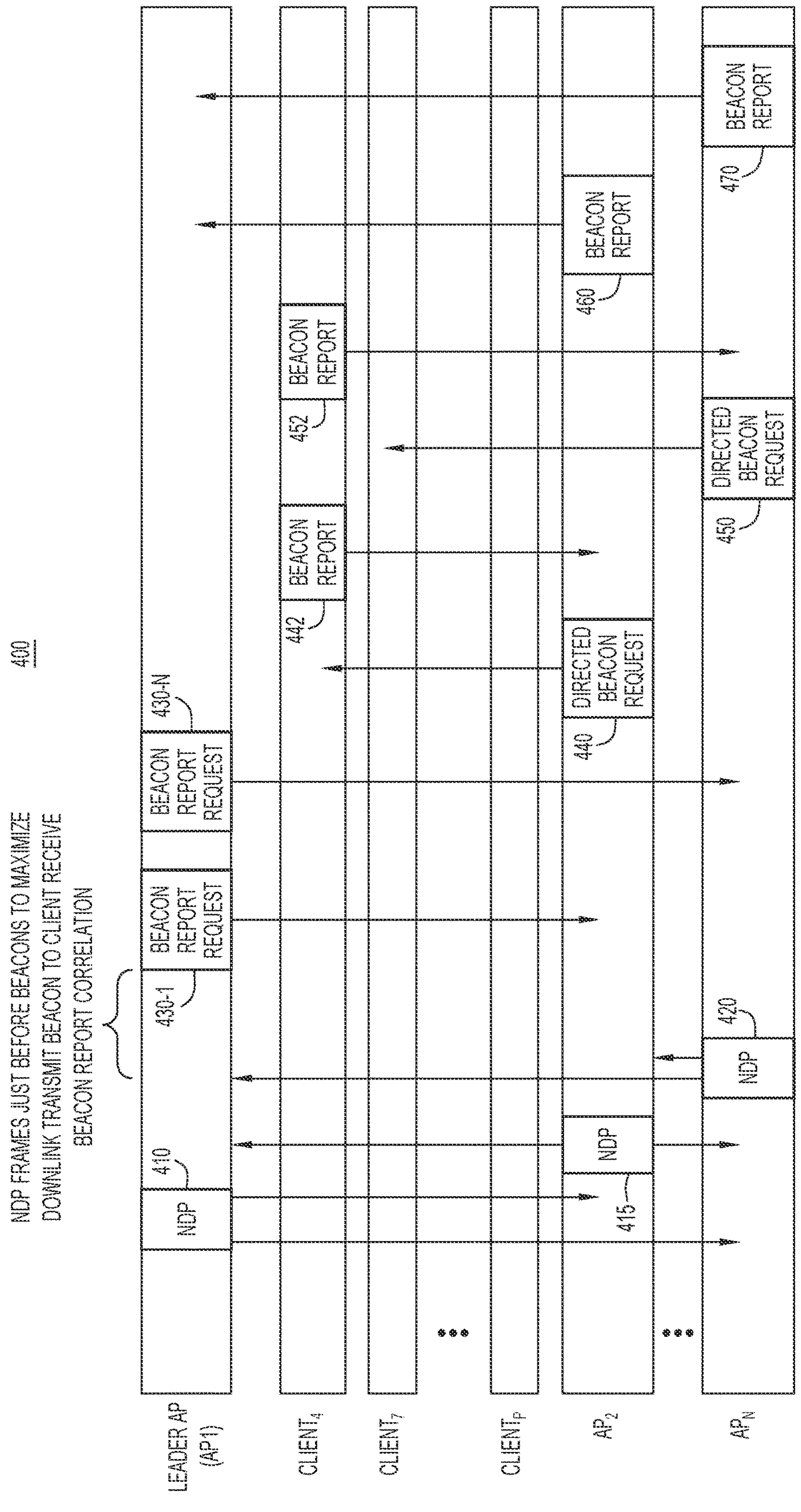
FIG. 4 is a timing diagram that depicts the use of neighbor discovery packets transmitted just prior to beacon report requests to maximize the relevant knowledge in beacon reports, according to an example embodiment.

At 410, $AP_1$ sends an NDP frame. Likewise, at 415, $AP_1$ broadcasts an NDP frame and at 420, $AP_N$ broadcasts an NDP frame. The timing of the NDP frames 410, 415 and 420 is such that they occur just before $AP_1$ sends beacon report requests 430-1 to 430-N to $AP_2$-$AP_N$, respectively. Thus, the NDP frames are transmitted on the same channel being scanned for beacon reporting and timed accordingly as shown in FIG. 4. By sending the NDP frames just before the beacon report requests are sent, the beacon reports that eventually come back from clients will have better time-relevance to what is learned about neighboring APs from the NDPs. This can be exploited to reduce the number of beacon reports to characterize the interference by maximizing the downlink beacons to the clients of interest.

Figure 5:
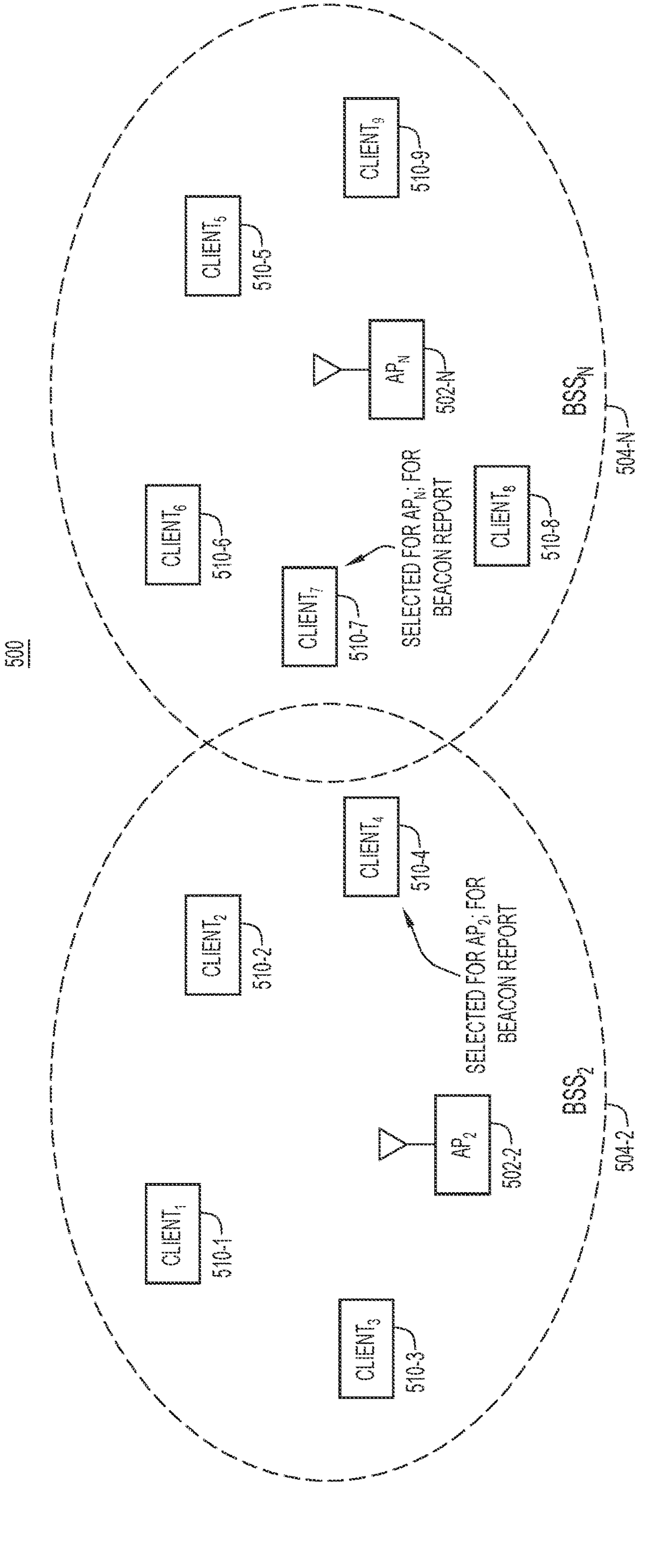
FIG. 5 is a diagram depicting selection of a cell edge wireless client device for which a directed beacon report is requested, according to an example embodiment.

As described above in connection with operation 330 in process 300 of FIG. 3, the number of beacon reports can be further reduced by selecting a representative client or a small subset of representative clients. That is, instead of, as a default, scanning all the clients on the APs (with the beacon request/report mechanism) and looking at all the RSSIs for co-channel interference possibilities, a particular client or a few clients is/are selected that is/are at the edge of a given AP's coverage and on the coverage boundary with a peer AP's coverage, and the rest of the clients in the cell can be ignored. Reference is made to FIG. 5 for an example illustration of this. For example, as shown in FIG. 5, an arrangement 500 is shown of two adjacent and partially overlapping BSS's, $BSS_2$ served by $AP_2$ 502-2 with a coverage area shown at 504-2 and BSSN served by $AP_N$ 502-N with a coverage area 504-N. $AP_2$ serves clients 510-1, 510-2, 510-3 and 510-4 and $AP_N$ serves clients 510-5, 510-6, 510-7, 510-8 and 510-9. Client 510-4 sits on the edge of coverage area 504-2 for $AP_2$ and client 510-7 sits on the edge of coverage area 504-N for $AP_N$. Thus, client 510-4 can be selected as a representative client for $BSS_2$ and client 510-7 can be selected as a representative client for $BSS_N$. $AP_1$ can notify $AP_2$ to engage in a directed beacon request to client 510-4 and can notify $AP_N$ to engage in a directed beacon request to client 510-7.

Returning to FIG. 4, the beacon report request 430-1 that $AP_1$ sends to $AP_2$ may include information that causes $AP_2$ to send a directed beacon request 440 to client 510-4 ($Client_4$) which then sends a beacon report 442 to $AP_2$. Likewise, the beacon report request 430-N that $AP_1$ sends to $AP_N$ may include information that causes $AP_N$ to send a directed beacon request 450 to client 510-7 ($Client_7$), which sends a beacon report 452 back to $AP_N$. AP2 then sends a beacon report 460 (with the information learned from $Client_4$) to $AP_1$ and $AP_N$ sends the beacon report 470 (with the information learned from $Client_7$) to $AP_1$. The beacon report request itself can be used (on the channel of $AP_1$ when $AP_2$-$AP_N$ are expecting to be off-channel scanning) as a source of energy for the clients or the beacon of $AP_1$ itself (which is on a set schedule) and then either the $AP_1$-to-AP$\mathbf{2}_N$ beacon report request 430-N after it, or pre-plan to have the $AP_2$-$AP_N$ issue the directed beacon requests 440 and 450 after the beacon time (alleviating the need of $AP_2$-$AP_N$ to tune to the channel of $AP_1$ to detect/receive it).

The selection of a representative (cell edge) client(s) can substantially reduce the number of clients for which to obtain beacon report information, yet still provide meaningful information for the associated cell/coverage area. The WLC knows from previous observations which clients heard which APs. If a client on a cell edge never hears AP1-AP10, there is no reason to ask that station again unless something changes with the client (it moves and/or the client-AP RSSI changes).

A peer AP may select one or more representative "cell edge peer AP facing" client(s) for directed beacon requests, aided by machine learning as above using similar classifiers to predict the clients that will cause interference to peer cell(s) at the scheduled TXOP).

The solution presented herein may leverage AP-client scheduling protocols (Stream Classification service (SCS), Restricted Target Wait Time (R-TWT), etc.) to know which client might cause interference on a given time-slot plus a random client or two (such as a client in carrier sense multiple access/collision avoidance (CSMA/CA) mode), or all/many clients that have non-stationary (falling) RSSIs (i.e., more likely to be moving and interfere with the peer AP as the client crosses a coverage boundary to a neighboring cell). A client that is moving like that may be a high priority client to poll based on classifying it as moving. Again, this helps to reduce the number of beacon reports needed to a small fraction of stations in the cell.

There are several ways that information may be shared between APs.

One way may involve receiving RSSI of Other BSS (OBSS) clients from the peer AP. The AP Queue Request Protocol or similar protocol may be used to learn about stations.

Another way is to leverage other protocol frames already being exchanged. For example, $AP_1$ and $AP_2$ can use NDP transmit/receive, Beacon transmit/receive to determine APs that can be coordinated (based on e.g., target signal-to-interference-plus-noise (SINR) for edge clients). This can help to cut-down on the overhead to share data between APs instead of using a dedicated management/control frame.

Figure 6:
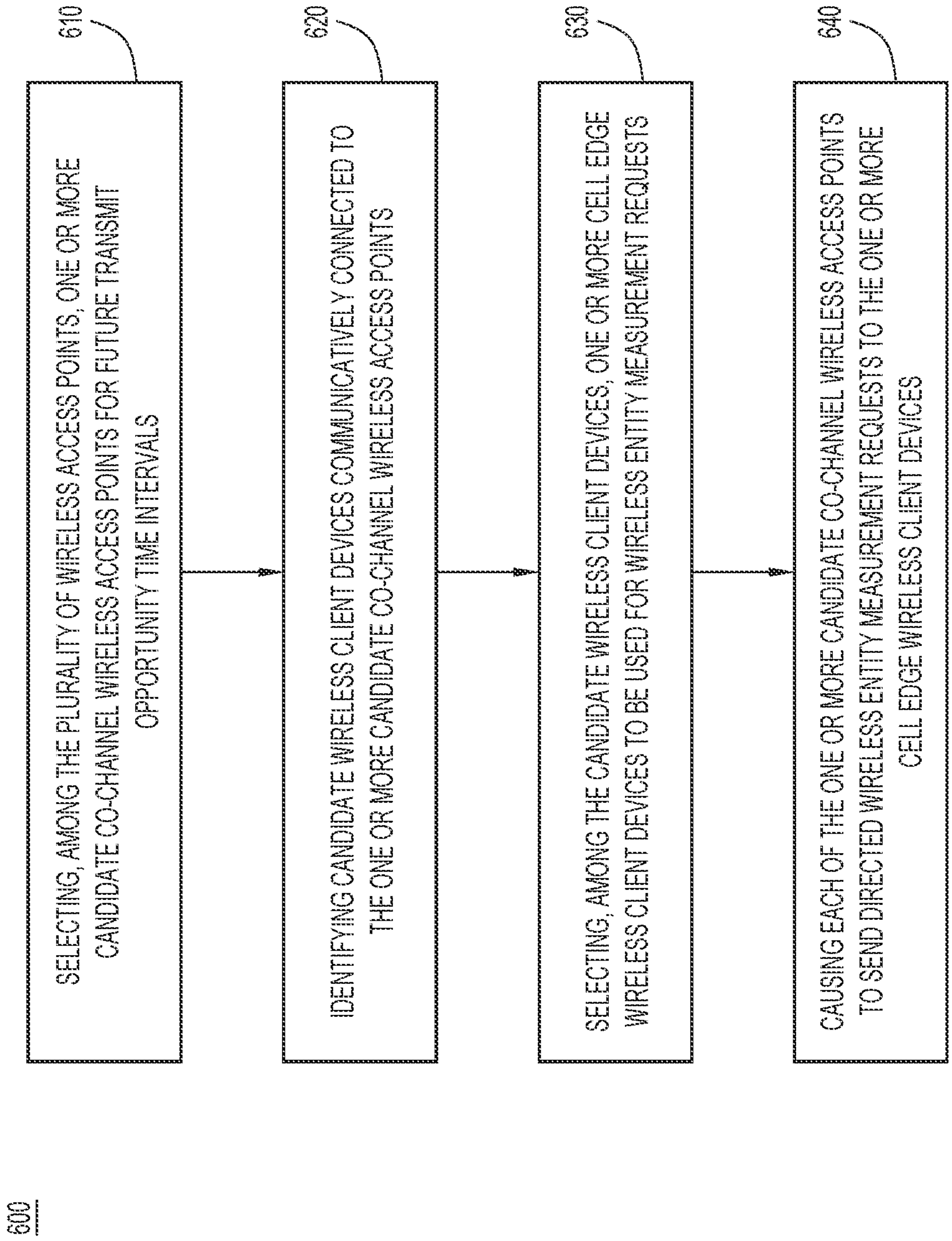
FIG. 6 is a flow chart of a method according to an example embodiment.

Reference is now made to FIG. 6, which illustrates a flow chart of a method 600 according to an example embodiment. The method 600 may be performed by a computing device/entity such as the WLC 110 shown in FIG. 1 for use with a wireless network that includes a plurality of wireless access points configured to operate in a multi-access point coordination arrangement. The method 600 includes, at 610, selecting, among the plurality of wireless access points, one or more candidate co-channel wireless access points for future transmit opportunity time intervals. At step 620, the method includes identifying candidate wireless client devices communicatively connected to the one or more candidate co-channel wireless access points. At step 630, the method includes selecting, among the candidate wireless client devices, one or more cell edge wireless client devices to be used for wireless entity measurement requests. At 640, the method includes causing each of the one or more candidate co-channel wireless access points to send directed wireless entity measurement requests to the one or more cell edge wireless client devices.

Figure 7:
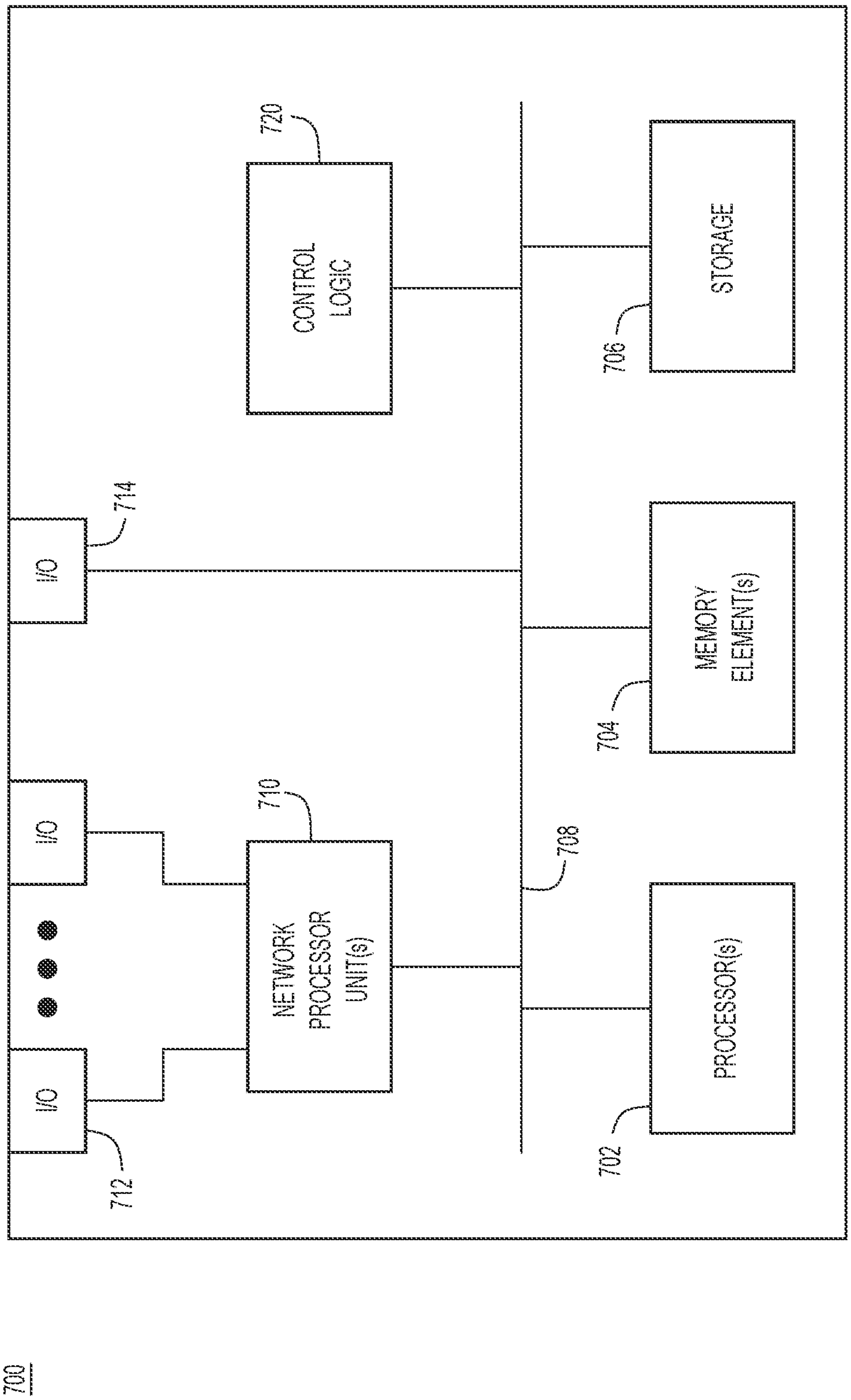
FIG. 7 is a block diagram of a computing device that may be configured to perform the operations presented herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as to perform the operations presented herein. In other words, an WLC 110 that performs the operations depicted in FIGS. 1-6 may take the form of the computing device 700 shown in FIG. 7.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer usable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method performed in a wireless network that includes a plurality of wireless access points configured to operate in a multi-access point coordination arrangement, the method including: selecting, among the plurality of wireless access points, one or more candidate co-channel wireless access points for future transmit opportunity time intervals; identifying candidate wireless client devices communicatively connected to the one or more candidate co-channel wireless access points; selecting, among the candidate wireless client devices, one or more cell edge wireless client devices to be used for wireless entity measurement requests; and causing each of the one or more candidate co-channel wireless access points to send directed wireless entity measurement requests to the one or more cell edge wireless client devices.

In some aspects, the techniques described herein relate to a method, wherein selecting the one or more candidate co-channel wireless access points is based on historical data related to co-channel wireless access points obtained over time for the wireless network.

In some aspects, the techniques described herein relate to a method, wherein selecting the one or more candidate co-channel wireless access points includes training a machine learning model based on the historical data to select the one or more candidate co-channel wireless access points by classifying wireless access points that were not a source of co-channel interference at previously scheduled transmit opportunity time intervals.

In some aspects, the techniques described herein relate to a method, wherein selecting includes using the machine learning model to predict which future transmit opportunity time intervals in a multi-access point coordination time slot sequence will be subject to interference.

In some aspects, the techniques described herein relate to a method, further including using the machine learning model to predict future interference on a certain time slot to configure a size of multi-access point coordination groups by avoiding forming coordination groups with a set of wireless access points that historically cause interference on a certain time slot.

In some aspects, the techniques described herein relate to a method, wherein identifying candidate wireless client devices includes a first wireless access point of the plurality of wireless access points: broadcasting a discovery frame to the one or more candidate co-channel wireless access points; and just after the discovery frame, transmitting wireless entity measurement requests to the one or more candidate co-channel wireless access points on a same wireless channel as the discovery frame.

In some aspects, the techniques described herein relate to a method, wherein causing each of the one or more candidate co-channel wireless access points to send directed wireless entity measurement requests includes including in the wireless entity measurement requests transmitted to the one or more candidate co-channel wireless access points, information indicating the one or more cell edge wireless client devices for each candidate co-channel wireless access point.

In some aspects, the techniques described herein relate to a method, wherein the selecting the one or more candidate co-channel wireless access points, identifying candidate wireless client devices, and selecting one or more cell edge wireless client devices are performed at a network controller that is in communication with the plurality of wireless access points.

In some aspects, the techniques described herein relate to a method, further including: identifying one or more wireless client devices that are moving between coverage areas of at least two wireless access points based on changing receive signal strength information at one or more of the at least two wireless access points; and selecting the one or more wireless client devices that are moving for directed wireless entity measurement requests.

In some aspects, the techniques described herein relate to a method, wherein the wireless entity measurement requests include beacon requests or a beacon request in combination with a frame request.

In some aspects, the techniques described herein relate to an apparatus including: a network interface configured to enable communication with a plurality of wireless access points in a wireless network; and a computer processor coupled to the network interface, wherein the computer processor is configured to perform operations including: selecting, among the plurality of wireless access points, one or more candidate co-channel wireless access points for future transmit opportunity time intervals; identifying candidate wireless client devices communicatively connected to the one or more candidate co-channel wireless access points; selecting, among the candidate wireless client devices, one or more cell edge wireless client devices to be used for wireless entity measurement requests; and causing each of the one or more candidate co-channel wireless access points to send directed wireless entity measurement requests to the one or more cell edge wireless client devices.

In some aspects, the techniques described herein relate to an apparatus, wherein selecting the one or more candidate co-channel wireless access points is based on historical data related to co-channel wireless access points obtained over time for the wireless network.

In some aspects, the techniques described herein relate to an apparatus, wherein identifying candidate wireless client devices includes a first wireless access point of the plurality of wireless access points: broadcasting a discovery frame to the one or more candidate co-channel wireless access points;

and just after the discovery frame, transmitting wireless entity measurement requests to the one or more candidate co-channel wireless access points on a same wireless channel as the discovery frame.

In some aspects, the techniques described herein relate to an apparatus, wherein causing each of the one or more candidate co-channel wireless access points to send directed wireless entity measurement requests includes including in the wireless entity measurement requests transmitted to the one or more candidate co-channel wireless access points, information indicating the one or more cell edge wireless client devices for each candidate co-channel wireless access point.

In some aspects, the techniques described herein relate to an apparatus, wherein the computer processor is further configured to perform: identifying one or more wireless client devices that are moving between coverage areas of at least two wireless access points based on changing receive signal strength information at one or more of the at least two wireless access points; and selecting the one or more wireless client devices that are moving for directed wireless entity measurement requests.

In some aspects, the techniques described herein relate to an apparatus, wherein the wireless entity measurement requests include beacon requests or a beacon request in combination with a frame request.

In some aspects, the techniques described herein relate to one or more non-transitory computer readable storage media encoded with instructions that, when executed by a computer processor, cause the computer processor to perform operations including: selecting, among a plurality of wireless access points in a wireless network, one or more candidate co-channel wireless access points for future transmit opportunity time intervals; identifying candidate wireless client devices communicatively connected to the one or more candidate co-channel wireless access points; selecting, among the candidate wireless client devices, one or more cell edge wireless client devices to be used for wireless entity measurement requests; and causing each of the one or more candidate co-channel wireless access points to send directed wireless entity measurement requests to the one or more cell edge wireless client devices.

In some aspects, the techniques described herein relate to one or more non-transitory computer readable storage media, wherein selecting the one or more candidate co-channel wireless access points is based on historical data related to co-channel wireless access points obtained over time for the wireless network.

In some aspects, the techniques described herein relate to one or more non-transitory computer readable storage media, wherein identifying candidate wireless client devices includes a first wireless access point of the plurality of wireless access points: broadcasting a discovery frame to the one or more candidate co-channel wireless access points; and just after the discovery frame, transmitting wireless entity measurement requests to the one or more candidate co-channel wireless access points on a same wireless channel as the discovery frame.

In some aspects, the techniques described herein relate to one or more non-transitory computer readable storage media, wherein causing each of the one or more candidate co-channel wireless access points to send directed wireless entity measurement requests includes including in the wireless entity measurement requests transmitted to the one or more candidate co-channel wireless access points, information indicating the one or more cell edge wireless client devices for each candidate co-channel wireless access point.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications, including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used, such as electric, sound, light, infrared, and/or radio, to facilitate communications through one or more networks in accordance with embodiments herein. Communications, interactions, operations, etc., as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method performed in a wireless network that includes a plurality of wireless access points configured to operate in a multi-access point coordination arrangement, the method comprising:

selecting, among the plurality of wireless access points, one or more candidate co-channel wireless access points for future transmit opportunity time intervals;

identifying candidate wireless client devices communicatively connected to the one or more candidate co-channel wireless access points;

selecting, among the candidate wireless client devices, one or more cell edge wireless client devices to be used for wireless entity measurement requests, wherein selecting the one or more cell edge wireless client devices comprises selecting one or more wireless client devices at coverage boundaries with peer wireless access point coverage, to serve as one or more representative wireless client devices for respective candidate co-channel wireless access points; and causing each of the one or more candidate co-channel wireless access points to send directed wireless entity measurement requests to the one or more cell edge wireless client devices, wherein directed wireless entity measurement requests are sent to the one or more representative wireless client devices to reduce a number of wireless entity measurement requests used to assess co-channel interference for a scheduled transmit opportunity time interval.

2. The method of claim 1, wherein selecting the one or more candidate co-channel wireless access points is based on historical data related to co-channel wireless access points obtained over time for the wireless network.

3. The method of claim 2, wherein selecting the one or more candidate co-channel wireless access points comprises training a machine learning model based on the historical data to select the one or more candidate co-channel wireless access points by classifying wireless access points that were not a source of co-channel interference at previously scheduled transmit opportunity time intervals.

4. The method of claim 3, wherein selecting comprises using the machine learning model to predict which future transmit opportunity time intervals in a multi-access point coordination time slot sequence will be subject to interference.

5. The method of claim 4, further comprising using the machine learning model to predict future interference on a certain time slot to configure a size of multi-access point coordination groups by avoiding forming coordination groups with a set of wireless access points that historically cause interference on a certain time slot.

6. The method of claim 1, wherein identifying candidate wireless client devices comprises a first wireless access point of the plurality of wireless access points:

broadcasting a discovery frame to the one or more candidate co-channel wireless access points; and just after the discovery frame, transmitting wireless entity measurement requests to the one or more candidate co-channel wireless access points on a same wireless channel as the discovery frame.

7. The method of claim 6, wherein causing each of the one or more candidate co-channel wireless access points to send directed wireless entity measurement requests comprises including in the wireless entity measurement requests transmitted to the one or more candidate co-channel wireless access points, information indicating the one or more cell edge wireless client devices for each candidate co-channel wireless access point.

8. The method of claim 1, wherein the selecting the one or more candidate co-channel wireless access points, identifying candidate wireless client devices, and selecting one or more cell edge wireless client devices are performed at a network controller that is in communication with the plurality of wireless access points.

9. The method of claim 1, further comprising:

identifying one or more wireless client devices that are moving between coverage areas of at least two wireless access points based on changing receive signal strength information at one or more of the at least two wireless access points; and selecting the one or more wireless client devices that are moving for directed wireless entity measurement requests.

10. The method of claim 1, wherein the wireless entity measurement requests include beacon requests or a beacon request in combination with a frame request.

11. An apparatus comprising:

a network interface configured to enable communication with a plurality of wireless access points in a wireless network; and a computer processor coupled to the network interface, wherein the computer processor is configured to perform operations including:

selecting, among the plurality of wireless access points, one or more candidate co-channel wireless access points for future transmit opportunity time intervals;

identifying candidate wireless client devices communicatively connected to the one or more candidate co-channel wireless access points, wherein identifying candidate wireless client devices comprises a first wireless access point of the plurality of wireless access points:

broadcasting a discovery frame to the one or more candidate co-channel wireless access points; and just after the discovery frame, transmitting wireless entity measurement requests to the one or more candidate co-channel wireless access points on a same wireless channel as the discovery frame;

selecting, among the candidate wireless client devices, one or more cell edge wireless client devices to be used for wireless entity measurement requests; and causing each of the one or more candidate co-channel wireless access points to send directed wireless entity measurement requests to the one or more cell edge wireless client devices, wherein causing each of the one or more candidate co-channel wireless access points to send directed wireless entity measurement requests comprises including in the wireless entity measurement requests transmitted to the one or more candidate co-channel wireless access points, information indicating the one or more cell edge wireless client devices for each candidate co-channel wireless access point.

12. The apparatus of claim 11, wherein selecting the one or more candidate co-channel wireless access points is based on historical data related to co-channel wireless access points obtained over time for the wireless network.

13. The apparatus of claim 11, wherein selecting the one or more cell edge wireless client devices comprises selecting one or more wireless client devices at coverage boundaries with peer wireless access point coverage, to serve as one or more representative wireless client devices for respective candidate co-channel wireless access points.

14. The apparatus of claim 13, wherein directed wireless entity measurement requests are sent to the one or more representative wireless client devices to reduce a number of wireless entity measurement requests used to assess co-channel interference for a scheduled transmit opportunity time interval.

15. The apparatus of claim 11, wherein the computer processor is further configured to perform:

identifying one or more wireless client devices that are moving between coverage areas of at least two wireless access points based on changing receive signal strength information at one or more of the at least two wireless access points; and selecting the one or more wireless client devices that are moving for directed wireless entity measurement requests.

16. The apparatus of claim 11, wherein the wireless entity measurement requests include beacon requests or a beacon request in combination with a frame request.

17. One or more non-transitory computer readable storage media encoded with instructions that, when executed by a computer processor, cause the computer processor to perform operations including:

selecting, among a plurality of wireless access points in a wireless network, one or more candidate co-channel wireless access points for future transmit opportunity time intervals, wherein selecting the one or more candidate co-channel wireless access points is based on historical data related to co-channel wireless access points obtained over time for the wireless network, and selecting comprises training a machine learning model based on the historical data to select the one or more candidate co-channel wireless access points by classifying wireless access points that were not a source of co-channel interference at previously scheduled transmit opportunity time intervals;

identifying candidate wireless client devices communicatively connected to the one or more candidate co-channel wireless access points;

selecting, among the candidate wireless client devices, one or more cell edge wireless client devices to be used for wireless entity measurement requests; and causing each of the one or more candidate co-channel wireless access points to send directed wireless entity measurement requests to the one or more cell edge wireless client devices.

18. The one or more non-transitory computer readable storage media of claim 17, wherein directed wireless entity measurement requests are sent to one or more representative wireless client devices at coverage boundaries with peer wireless access point coverage to reduce a number of wireless entity measurement requests used to assess co-channel interference for a scheduled transmit opportunity time interval.

19. The one or more non-transitory computer readable storage media of claim 17, wherein identifying candidate wireless client devices comprises a first wireless access point of the plurality of wireless access points:

broadcasting a discovery frame to the one or more candidate co-channel wireless access points; and just after the discovery frame, transmitting wireless entity measurement requests to the one or more candidate co-channel wireless access points on a same wireless channel as the discovery frame.

20. The one or more non-transitory computer readable storage media of claim 19, wherein causing each of the one or more candidate co-channel wireless access points to send directed wireless entity measurement requests comprises including in the wireless entity measurement requests transmitted to the one or more candidate co-channel wireless access points, information indicating the one or more cell edge wireless client devices for each candidate co-channel wireless access point.

* * * * *